(12) United States Patent
Casey et al.

(10) Patent No.: US 6,205,488 B1
(45) Date of Patent: Mar. 20, 2001

(54) INTERNET PROTOCOL VIRTUAL PRIVATE NETWORK REALIZATION USING MULTI-PROTOCOL LABEL SWITCHING TUNNELS

(75) Inventors: Liam M. Casey, Ottawa; Ian M. Cunningham, Kanata; Robert W. Eros, Nepean, all of (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/191,845

(22) Filed: Nov. 13, 1998

(51) Int. Cl.[7] .................................................. G06F 15/173
(52) U.S. Cl. ................................................ 709/238; 709/242
(58) Field of Search .................................. 709/238, 239, 709/240, 241, 242, 227, 230

(56) References Cited

U.S. PATENT DOCUMENTS

| | | | |
|---|---|---|---|
| 5,754,543 | * | 5/1998 | Seid ..................................... 370/351 |
| 5,768,271 | * | 6/1998 | Seid et al. ............................ 370/389 |
| 6,079,020 | * | 6/2000 | Liu ....................................... 713/201 |
| 6,081,524 | * | 6/2000 | Chase et al. ......................... 370/369 |

* cited by examiner

Primary Examiner—Zarni Maung
(74) Attorney, Agent, or Firm—Cobrin & Gittes

(57) ABSTRACT

A virtual private network enables private communications between two or more private networks over a shared MPLS network. The virtual private network disclosed, includes multiple routers connected to the shared MPLS network and configured to dynamically distribute VPN information across the shared MPLS network. The VPN information distributed by a router includes a VPN identifier assigned to that router, which identifies a VPN with which that router is associated. The router includes a first table which stores a map of the label switched paths from the router in question to all other routers connected to the shared MPLS network. The router also includes a second table which stores a map of label switched paths from the router in question to all other routers connected to the shared MPLS network which share a common VPN identifier.

26 Claims, 3 Drawing Sheets

PR Private Router
VBR VPN Border Router
LSR Label Switch Router

INTERNET PROTOCOL VIRTUAL PRIVATE NETWORK REALIZATION USING MULTI-PROTOCOL LABEL SWITCHING TUNNELS

FIELD OF THE INVENTION

The invention relates generally to the field of virtual private networks and more particularly, to distribution of private network information over shared network infrastructure in the Multi-Protocol Label Switching domain.

BACKGROUND OF THE INVENTION

With the growing popularity of the Internet and networks in general, there is a trend towards centralized network services and centralized network service providers. To be profitable, however, network service providers need to constantly maintain and if possible enlarge their customer base and their profits. Since leased line services are coming under increased competition, profit margins have been decreasing for these providers. Thus, an increased number of providers are trying to attract small and medium sized businesses by providing centralized network management.

Network providers are offering Virtual Private Networks (VPNs) to interconnect various customer sites that are geographically dispersed. VPNs are of great interest to both providers and to their customers because they offer privacy and cost efficiency through network infrastructure sharing. There has been difficulty providing this service, however, due to address conflicts, security problems, scalability issues and performance problems.

Various VPN models have been proposed with various degrees of security, privacy, scalability, ease of deployment and manageability. Some providers have even attempted to solve these problems using Multi-Protocol Label Switching (MPLS) networks. However the MPLS models proposed still suffer from some of the same problems discussed above (i.e. scalability, etc.).

Accordingly there exists the need for a scalable system which allows the implementation of separate virtual private networks over common infrastructure while providing security and sufficient performance to each network.

The need further exists for such a system which allows for communicating private traffic through a shared network.

It is accordingly an object of the present invention to provide a scalable system which allows the implementation of separate virtual private networks over common infrastructure while providing security and sufficient performance to each network.

It is another object of the invention to provide such a system which employs MPLS.

It is another object of the invention to provide such a system which allows for communication of private traffic through a shared network.

These and other objects of the invention will become apparent to those skilled in the art from the following description thereof.

SUMMARY OF THE INVENTION

It has now been discovered that these and other objects may be accomplished by the present virtual private networks which enable private communications over a shared MPLS network, between at least two private networks. The present invention includes multiple routers in communication with the shared MPLS network and configured to dynamically distribute VPN information across the shared MPLS network. The VPN information distributed by a particular one of the routers includes a VPN identifier assigned to that router. The VPN identifier identifies a VPN which the particular routers is associated with. One of the routers includes a first table, stored therein of label switched paths from that router to the remainder of routers in communication with the shared MPLS network. That router also includes a second table, stored therein, of nested label switched paths from that router to the remainder of routers in communication with the shared MPLS network which share a common VPN identifier.

In an embodiment of the invention, the virtual private network includes router means in communication with the shared MPLS network for routing VPN information across the shared MPLS network. The VPN information includes a VPN identifier assigned to the router means, which identifies a VPN with which the router means is associated. A first table is stored in the router means, and contains a list of all label switched paths across the shared MPLS network. A second table is stored in the router means and contains a list of nested label switched paths from a portion of the router means which is configured to communicate with one of the at least two private networks to another portion of the router means which is configured to communicate with another of the at least two private networks.

In another embodiment, the invention includes a method of configuring virtual private networks over a shared MPLS network. The method includes configuring the shared MPLS network including at least two routers in communication therewith. It further includes determining first information about all label switched paths between a first of the at least two routers and all others of the at least two routers, and storing the first information in the first router. The all others of the at least two routers includes a second router. The method also includes assigning a common VPN identifier to the first and second routers. It includes determining second information about all label switched paths between the second router and all remaining of the at least two routers, and storing the second information in the second router. The first router is a member of the remaining routers. It includes determining third information about all nested label switched paths between the first router and all others of the at least two routers which are assigned the common VPN identifier, and storing the third information in the first router. It also includes determining fourth information about all nested label switched paths between the second router and all remaining routers which are assigned the common VPN identifier, and storing the fourth information in the second router.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and accompanying drawings, in which.

DETAILED DESCRIPTION OF THE INVENTION

The present invention enables the formation of VPNs by distributing VPN information throughout a shared Multi-Protocol Label Switched (MPLS) network. While only Label Distribution Protocol (LDP) connections will be discussed, those skilled in the art will recognize that there are several ways to accomplish the distribution of the VPN information such as OSPF opaque LSAs, TCP connections, BGP-4, etc. without departing from the scope of the present invention.

The present invention exploits the Label Switch Path (LSP) mesh implicitly established between all edge routers in a MPLS domain. It uses 2 levels of LSP tunneling: the outer/base level, which is the hop by hop LSP tunneling that interconnect all VPN Border/Label Switched Routers (VBRs/LSRs). VBRs are also referred to as edge routers); and, the bottom of label stack/nested level, which provides logically single hop tunnels between VBRs. For each IP VPN, single hop nested tunnels are established between all VBRs serving that particular VPN.

Figure 1:
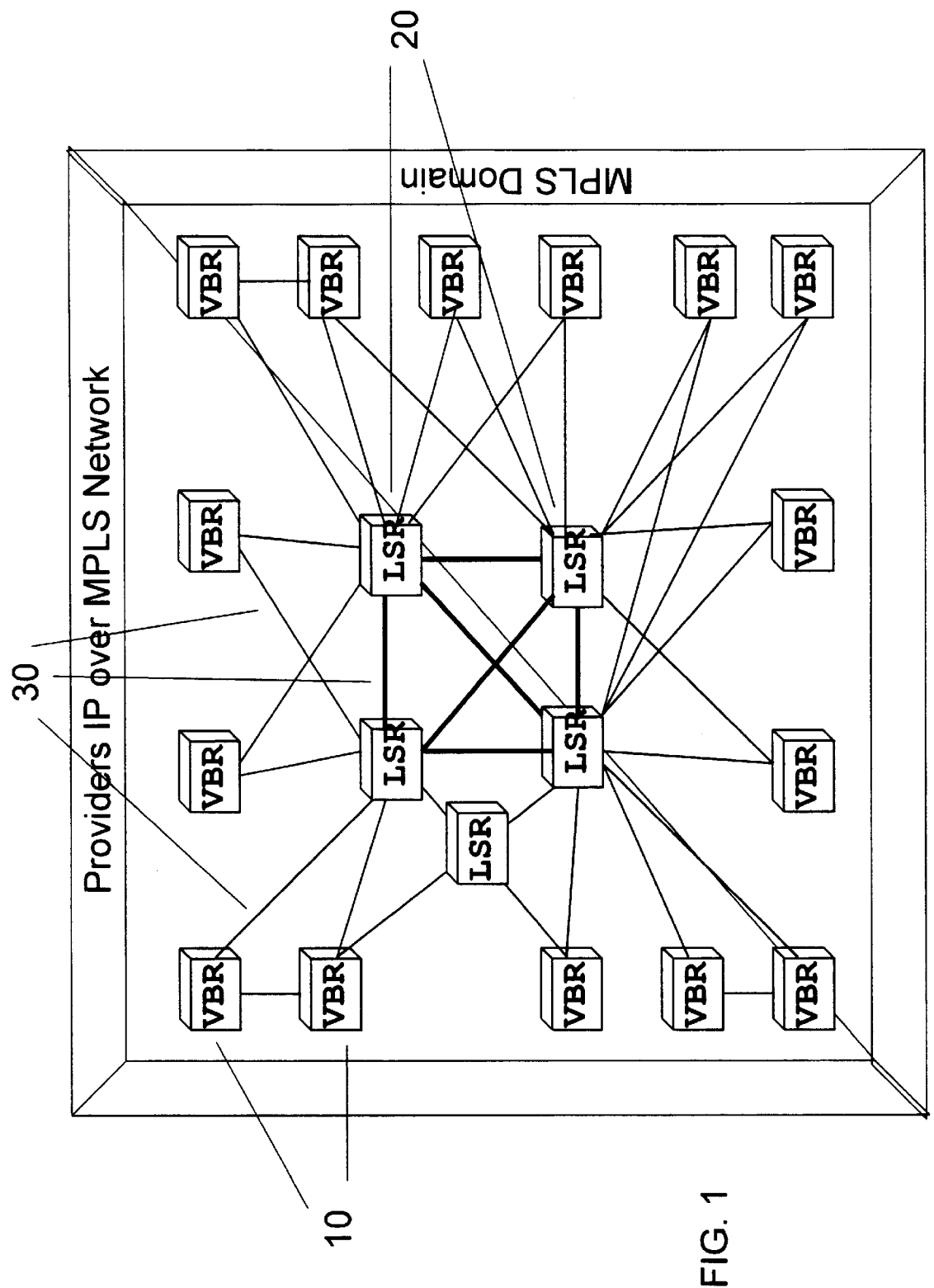
FIG. 1 depicts a block diagram of a shared MPLS network in accordance with the invention.

FIG. 1. illustrates a possible configuration of an MPLS network. Those skilled in the art will recognize that other configurations are possible (i.e. more or fewer LSRs also referred to as core routers, more or fewer VBRs, and different connections therebetween). A service provider or consortium of service providers (the provider) wishing to offer IP VPN service first configures one or more MPLS domains. Each MPLS domain becomes a VPN area. The VPN area consists of VBRs 10 around the edge and core LSRs 20, interconnected by links 30. The interfaces to the links 30 each have assigned to them an IP address from the provider's IP address space. In particular a VBR 10 has an IP address in the provider's IP address space. This address is not directly visible within any of the IP VPNs that the VBR 10 will support.

Figure 2:
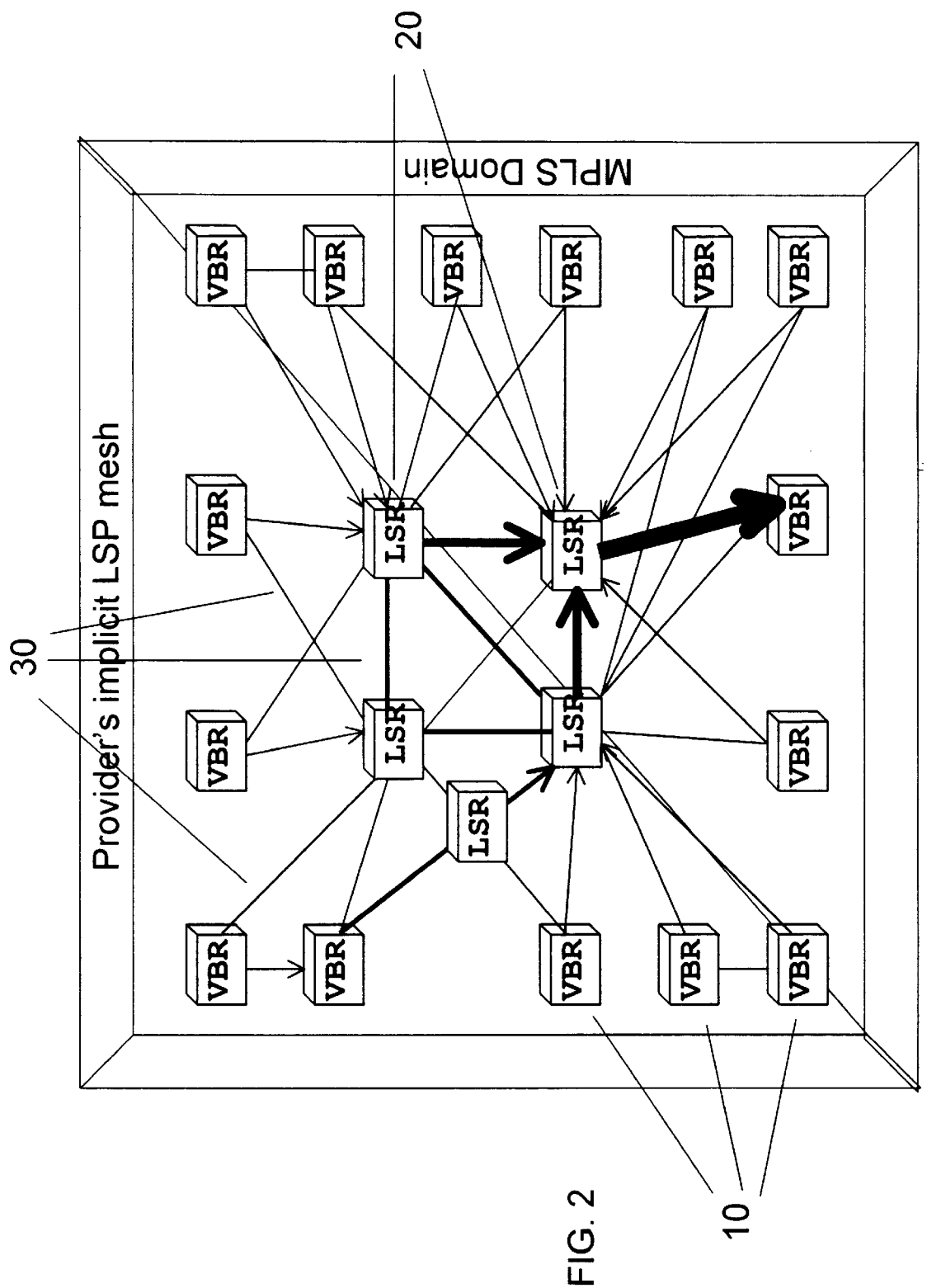
FIG. 2 depicts a block diagram of a the shared MPLS network depicted in FIG. 1 illustrating a router building up an LSP list.

The provider determined routing regime determines routes within the MPLS domain and then, as per normal MPLS operation, Label Distribution Protocol is invoked to establish implicit LSPs across the MPLS domain which include the intermediate hops required to get from one VBR 10 to another VBR 10. FIG. 2 illustrates the label switched path tree terminating on a VBR 10. The full mesh is realized by label switched path trees terminating on all VBRs 10. The result is a full mesh of LSPs between all LSRs 20 and VBRs 10. (i.e. in each LSR and VBR there is a Forwarding Equivalence Class (FEC) to next hop label map that has an entry in it for every other LSR and VBR for the first hop of an LSP to that VBR. This defines the base tunnel mesh). These first hop labels in the FEC map are referred to as base labels. They will be used as the top of stack labels for all inter VBR traffic. Base labels will be swapped at each LSR 20 on the path to the destination VBR 10.

After the MPLS network is configured, the provider can configure a VPN. To do so, the provider selects VBRs 10 from the MPLS domain that will serve the VPN and configures a Virtual Router (VR) at each one by assigning it a VPN ID. While VRs are discussed herein, those skilled in the art will recognize that other routing mechanisms such as bridges, switches and the like could be employed without departing from the scope of the invention. The provider then provisions stub links (i.e. links between VRs and one or more routers at each private network (private routers)). Stub link interfaces are assigned IP addresses from the private network's IP address space. If the provider has a globally unique subnet address range, he can reuse it within every IP VPN. It will not overlap with the private network IP address space whether the private network is using its own globally unique address space, or is using private addresses, 10.x.x.x etc.

If the IP VPN to be established spans multiple VPN areas the provider must enable VRs in some of the gateway VBRs 10 that straddle the relevant VPN areas. These gateway VRs will participate in the following steps in all the VPN areas in which they are configured to operate.

Using a VR to exchange routing information with one or more enterprise site routers is the most general mechanism for disseminating private network reachability information. Part of the stub link configuration is to specify what routing protocol runs over it, between the private network router and the VBR 10.

The LDP session initiation process is used as the method of VRs discovering their peers, since an object of the present invention is to establish a second level of MPLS tunnels. Every VR sends an LDP hello message down every base network LSP that exits its VBR. Hello messages (and any subsequent session messages) are encapsulated with the base MPLS label so that they are carried all the way to destination VBR 10. The LDP hello message is a form of query to determine if a VR for the same VPN (a peer) resides at the destination VBR. The VPN ID is carried in the header of the LDP link hello as the <label space id> field. A receiving VBR 10 will only register an LDP hello adjacency if the <label space id> is one that it supports (i.e. if it has a VR for the same VPN ID).

When a hello adjacency is registered, the relevant VR proceeds to initiate an LDP session with its peer. One of the two VRs will initiate a TCP connection to the other. The IP source and destination addresses used here are the base network IP addresses of the respective VBRs 10. After the TCP connection is in place, and the necessary initiation messages have been exchanged, then an LDP session between the peer VRs exists. The LDP session is established and the two VRs offer each other a label for a LSP tunnel to itself. The peer VR will store this in a forwarding table as the nested label 40 (i.e. the first label to be pushed on the label stack) for the destination VR. This nested label 40 does not include any labels for intermediate hops required to traverse the MPLS network. As far as the VRs are concerned, this LSP tunnel is a single hop to its peer. This label is referred to as the peer label or nested tunnel label.

The peer labels may be the only ones that are exchanged between VRs, but this is not a requirement. Extra labels may be exchanged for encapsulating different classes of traffic destined for different VRs.

Figure 3:
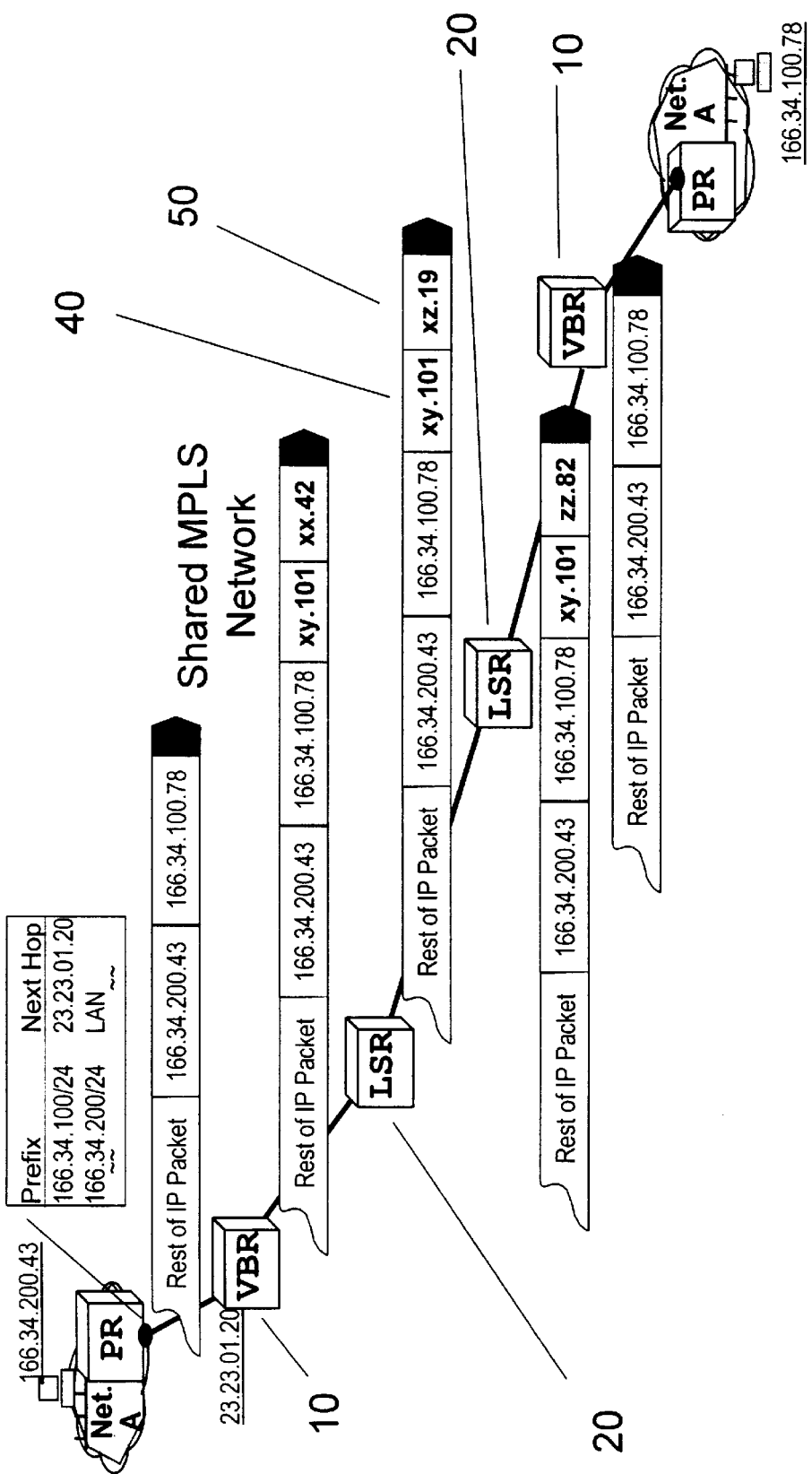
FIG. 3 depicts an example of communicating an IP packet in accordance with the invention over the MPLS network depicted in FIG. 1.

As a result of routing exchanges between peer VRs and between VRs and private network routers, as appropriate, each VR will build a forwarding table that relates private network address prefixes (forward equivalency classes) to next hop. The next hop could be stored as the IP addresses of the end points the nested LSP tunnel to be used, or it could just be the tunnel labels (both levels). As illustrated in FIG. 3, when IP packets arrive whose next hop is a VBR 10, the forwarding process pushes first the label 40 for the peer VR (the nested tunnel label). Then the base label 50, for the first hop of the base network LSP that leads to the VBR 10, is pushed onto the packet. The doubly labeled packet is then forwarded to the next LSR in the base network LSP. When the packet arrives at the destination VBR 10 the outermost label 50 may have changed several times, but the nested label 40 has not changed. As the label stack is popped, the nested label 40 is used to direct the packet to the correct VR.

It will thus be seen that the invention efficiently attains the objects set forth above, among those made apparent from the preceding description. In particular, the invention provides a virtual private network and methods of configuring the same over a MPLS shared network. Those skilled in the art will appreciate that the configuration depicted in FIGS. 1–3 discloses a shared MPLS network which allows the implementation of separate networks over common infrastructure while providing security, scalability and performance to each network.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A virtual private network (VPN) which enables private communications over a shared Multi-Protocol Label Switched (MPLS) network, between at least two private networks, comprising:
    a plurality of routers in communication with the shared MPLS network and configured to dynamically distribute VPN information across the shared MPLS network, wherein said VPN information distributed by a particular one of said plurality of routers includes a VPN identifier assigned to said particular one of said plurality of routers, which identifies a VPN which said particular one of said plurality of routers is associated with;
    a first table, stored in one of said plurality of routers, of label switched paths from said one of said plurality of routers to a remainder of said plurality of routers;
    a second table, stored in said one of said plurality of routers, of nested label switched paths from said one of said plurality of routers to a remainder of said plurality of routers which share a common VPN identifier.

2. The virtual private network according to claim 1 further comprising:
    a third table, stored in another of said plurality of routers, of label switched paths from said another of said plurality of routers to all others of said plurality of routers; and,
    a fourth table, stored in said another of said plurality of routers, of nested label switched paths from said another of said plurality of routers to all others of said plurality of routers which share a common VPN identifier.

3. The virtual private network according to claim 2 wherein said second and fourth tables are formed using a Label Distribution Protocol to determine said nested label switched paths.

4. The virtual private network according to claim 2 wherein:
    said one of said plurality of routers and said other of said plurality of routers are assigned a common VPN identifier;
    said second table includes a nested label switch path from said one of said plurality of routers to said another of said plurality of routers; and said fourth table includes a nested label switch path from said another of said plurality of routers to said one of said plurality of routers.

5. The virtual private network according to claim 4 further comprising at least one core label switched router coupled between said one and another of said plurality of routers and configured to transport communications between said one and another of said plurality of routers.

6. The virtual private network according to claim 2 further comprising:
    another MPLS network in communication with said shared MPLS network;
    another plurality of routers in communication with said another MPLS network and configured to dynamically distribute said VPN information across said another MPLS network, wherein said another plurality of routers includes said another of said plurality of routers;
    a fifth table, stored in said another of said plurality of routers, of label switched paths from said another of said plurality of routers to a remainder of said another plurality of routers; and,
    a sixth table, stored in said another of said plurality of routers, of nested label switched paths from said another of said plurality of routers to a remainder of said another plurality of routers which share a common VPN identifier.

7. The virtual private network according to claim 6 further comprising:
    a seventh table, stored in one of said another plurality of routers, of label switched paths from said one of said another plurality of routers to all others of said another plurality of routers; and,
    an eighth table, stored in said one of said another plurality of routers, of nested label switched paths from said one of said another plurality of routers to all others of said another plurality of routers which share a common VPN identifier.

8. The virtual private network according to claim 7 wherein said sixth and eighth tables are formed using said Label Distribution Protocol to determine said nested label switched paths.

9. The virtual private network according to claim 7 wherein:
    said one of said plurality of routers includes a first private router; and,
    said another of said plurality of routers includes a second private router.

10. The virtual private network according to claim 2 wherein at least one of said plurality of routers is a virtual router.

11. A virtual private network (VPN) which enables private communications over a shared Multi-Protocol Label Switched (MPLS) network, between at least two private networks, comprising:
    router means in communication with the shared MPLS network for routing VPN information across the shared MPLS network, wherein said VPN information includes a VPN identifier assigned to said router means, which identifies a VPN which said router means is associated with;
    a first table, stored in said router means, of all label switched paths across the shared MPLS network; and,
    a second table, stored in said router means, of nested label switched paths from a portion of said router means which is configured to communicate with one of the at least two private networks to another portion of said router means which is configured to communicate with another of the at least two private networks.

12. The virtual private network according to claim 11 further comprising:
   a third table, stored in said router means, of all label switched paths across the shared MPLS network; and
   a fourth table, stored in said router means, of nested label switched paths from said another portion of said router means to said portion of said router means.

13. The virtual private network according to claim 12 wherein said second and fourth tables are formed using a Label Distribution Protocol to determine said nested label switched paths.

14. The virtual private network according to claim 12 wherein said router means comprises:
   a first router, a second router and at least one core label switched router in communication with said first and second routers and configured to transport communications therebetween.

15. The virtual private network according to claim 14 further comprising:
   another MPLS network in communication with said shared MPLS network;
   second router means in communication with said another MPLS network for distributing said VPN information across said another MPLS network, wherein said second router means includes said second router and a third router;
   a fifth table, stored in said second router, of all label switched paths across said another MPLS network; and,
   a sixth table, stored in said second router of nested label switched paths from said second router to said third router.

16. The virtual private network according to claim 15 further comprising:
   a seventh table, stored in said third router, of all label switched paths from said third router across said another MPLS network;
   an eighth table, stored in said third router, of nested label switched paths from said third router to said second router.

17. The virtual private network according to claim 16 wherein said sixth and eighth tables are formed using a Label Distribution Protocol to determine said nested label switched paths.

18. The virtual private network according to claim 11 wherein said router means includes at least one virtual router.

19. A method of configuring virtual private networks over a shared MPLS network comprising:
   configuring a shared MPLS network including at least two routers in communication therewith;
   determining first information about all label switched paths between a first of said at least two routers and all others of said at least two routers, wherein said all others of said at least two routers includes a second router;
   storing said first information in said first router;
   assigning a common VPN identifier to said first and second routers;
   determining second information about all label switched paths between said second router and all remaining of said at least two routers, wherein said first router is a member of said all remaining of said at least two routers;
   storing said second information in said second router;
   determining third information about all nested label switched paths between said first router and all others of said at least two routers which are assigned said common VPN identifier;
   storing said third information in said first router;
   determining fourth information about all nested label switched paths between said second router and all remaining of said at least two routers which are assigned said common VPN identifier;
   storing said fourth information in said second router.

20. The method of configuring virtual private networks according to claim 19 wherein said determining said third and fourth information is performed using a Label Distribution Protocol.

21. The method of configuring virtual private networks according to claim 19 further comprising:
   partitioning said MPLS network into a plurality of network areas;
   wherein said at least two routers are in communication with one of said areas;
   wherein a plurality of routers are in communication with another of said plurality of network areas;
   wherein at least two of said network areas are in communication through said second router;
   determining fifth information about all label switched paths between said second router and all others of said plurality of routers, wherein said all others of said plurality of routers includes a third router;
   storing said fifth information in said second router;
   assigning said common VPN identifier to said third router;
   determining sixth information about all nested label switched paths between said second router and all others of said plurality of routers which are assigned said common VPN identifier;
   storing said sixth information in said second router;
   communicating said sixth information from said second router to said first router;
   storing said sixth information in said first router.

22. The method of configuring virtual private networks according to claim 21 further comprising:
   determining seventh information about all label switched paths between said third router and all remaining of said plurality of routers, wherein said all others of said plurality of routers includes said second router;
   storing said seventh information in said third router;
   determining eighth information about all nested label switched paths between said third router and all remaining of said plurality of routers which are assigned said common VPN identifier;
   storing said eighth information in said third router.

23. The method of configuring virtual private networks according to claim 22 wherein said determining said sixth and eighth information is performed using a Label Distribution Protocol.

24. The method of configuring virtual private networks in accordance with claim 22 further comprising:
   creating a link between a first private network router and said first router;
   creating a link between a second private network router and said third router;
   transmitting an IP packet from said first private network router to said second private network router including:

transmitting said IP packet from said first private network router to said first router across said link therebetween;

said first router pushing a label from said third information onto said IP packet when said first router receives said IP packet;

after pushing a label from said second information onto said IP packet, pushing a label from said first information onto said IP packet; and forwarding said labeled IP packet to said second router;

said second router replacing said label from said second information with a label from said sixth information; and, forwarding said IP packet towards said third router.

25. The method of configuring virtual private networks in accordance with claim 24 further comprising:

at least one core label switched router coupled between said first and second routers which replaces said label from said second information with a different label; and, wherein the second router replaces the different label with said label from said sixth information.

26. The method of configuring virtual private networks in accordance with claim 19 further comprising:

creating a link between a first private network router and said first router;

creating a link between a second private network router and said second router;

transmitting an IP packet from said first private network router to said second private network router including:

transmitting said IP packet from said first private network router to said first router across said link therebetween;

said first router pushing a label from said third information onto said IP packet when said first router receives said IP packet;

after pushing a label from said third information onto said IP packet, pushing a label from said first information onto said IP packet; and forwarding said labeled IP packet.

* * * * *